July 30, 1963    J. C. LI ETAL    3,099,526
RECOVERY OF EARTH ACIDS FROM SLAG
Filed Aug. 9, 1961
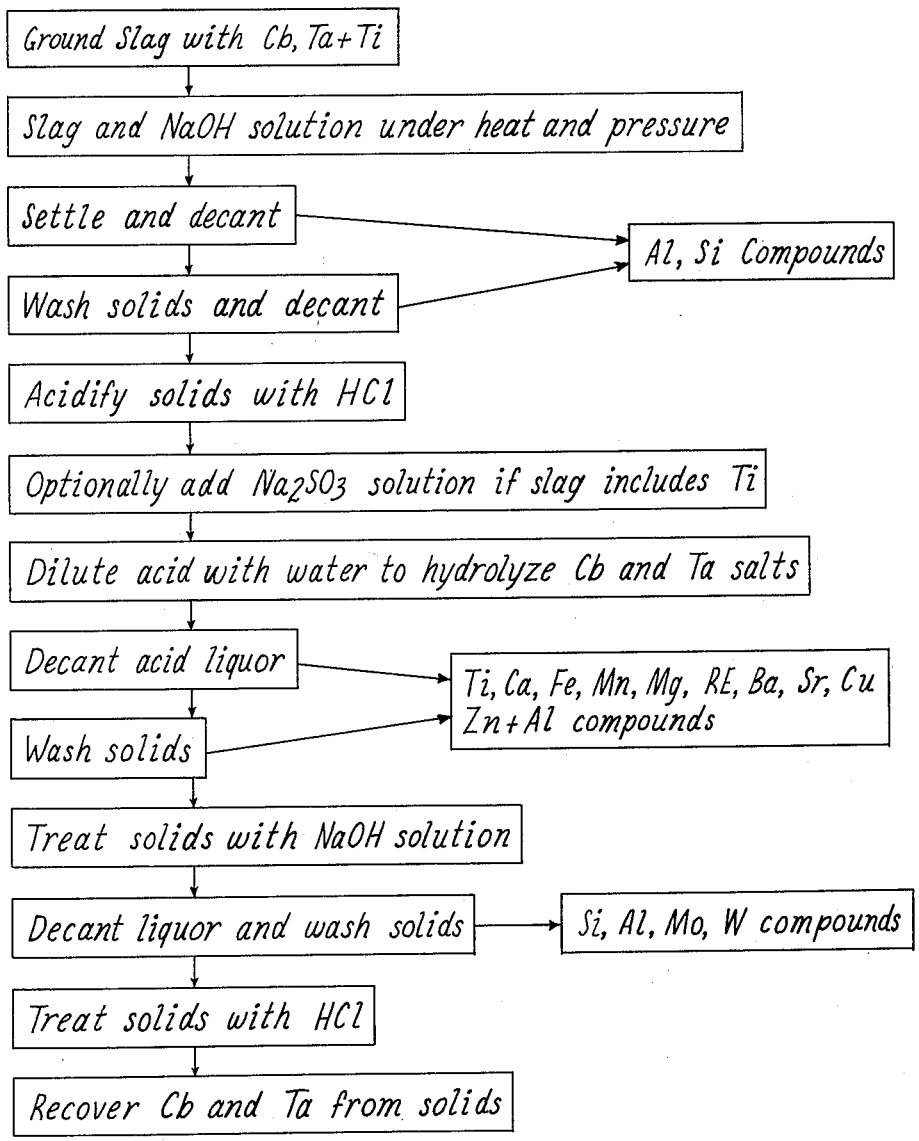
INVENTORS
JOHN C. LI
ROBERT E. BAKER
BY
Morgan, Finnegan, Durham & Pine
ATTORNEYS … # 3,099,526
Patented July 30, 1963

3,099,526
RECOVERY OF EARTH ACIDS FROM SLAG
John C. Li, Glen Cove, and Robert E. Baker, Sea Cliff,
N.Y., assignors to Wah Chang Corporation, New York,
N.Y., a corporation of New York
Filed Aug. 9, 1961, Ser. No. 130,435
6 Claims. (Cl. 23—18)

The present invention relates to new and useful improvements in the separation and recovery of those elements known as the earth acids, that is columbium, tantalum and titanium from tin slag or other material containing them.

In general the process of the present invention has for an object the provision of a novel and improved process for the economical separation and recovery of the earth acids from highly siliceous and refractory materials, such as tin or other slags, and for the removal of silica and other undesirable material, such as calcium, iron and aluminum compounds. Another object of the invention is the provision of such a process in which other valuable elements such as tungsten, molybdenum and the rare earth metals are simultaneously separated from slag and made available for recovery by standard methods of precipitation or other extraction.

In the normally practiced, present day methods for the separation of elements known as the earth acids (columbium, tantalum, and titanium), the separation is carried out in an acid medium. One of the acids used is hydrofluoric acid which is a solvent for silica. The presence of silica during this operation increases the consumption of hydrofluoric acid to a point where the head material would not be economical to treat.

There are some slags containing tantalum and columbium that could be considered as valuable sources of these two elements if they could be upgraded and have a substantial amount of the silica and other diluents removed economically, but, in the past some of the highly siliceous and other refractory slags have been found difficult to open or decompose by low cost economic methods. For this reason there are, stored in many parts of the world, stockpiles of slag containing large quantities of metal.

Also, it has heretofore been found possible to open or decompose some slags by the use of low cost mineral acids, such as hydrochloric or sulfuric acid. This has resulted in some cases in complete decomposition and in other cases only partial decomposition.

According to the process of the present invention, the slag or other material containing the values to be recovered, including especially columbium, tantalum, and titanium and often containing elements such as tungsten, molybdenum, and some or all of the rare earth metals, is first ground to a relatively fine mesh, preferably minus 200 mesh. Thereafter, the ground material is mixed with an aqueous solution of alkali metal hydroxide, is subjected to heat and pressure for a period of time, after which the alkali solution, containing much of the silica, is removed from the ground slag.

The residue from the alkaline treatment of the ground slag is then treated with a strong mineral acid, such as hydrochloric acid (other than hydrofluoric acid or an acid which does not solubilize such metal radicles as calcium), to remove from its elements such as calcium, iron and aluminum. The acidified residue is diluted with water to precipitate by hydrolysis the columbium and tantalum which may have been dissolved by the acid. If titanium is present some sodium sulfite should be added to maintain the titanium in solution. The acid is then drained from the pulp or slurry, which is washed to remove the calcium, iron and aluminum salts from the pulp or slurry. The recovered acid, as well as the wash water, may be retained for recovery of the values therein, in the event that the slag contained elements, such as titanium, copper, zinc and rare earth metals, worth recovering by conventional methods.

The acid-treated and washed slurry or pulp is then subjected to a second treatment with an aqueous solution of caustic alkali, such as sodium hydroxide, and for this purpose the alkaline liquor from the first caustic treatment may be used for this second alkali treatment, together with whatever additional fresh alkali is needed to make up the desired volume and concentration of the second bath. This second alkaline treatment dissolves substantially all of the remaining silica, and is separated by filtering or settling, and by washing, with the decanted alkaline liquor being recirculated in the process, if desired.

The slurry is then reacidified with an acid, such as hydrochloric acid, to convert the tantalum and columbium values therein to their acid form which may be separated from the slurry by filtering, settling or otherwise, after which the insoluble acid material may be concentrated, purified and converted by conventional processes for the treatment of materials containing insoluble compounds of columbium and/or tantalum.

The alkaline liquors after being recirculated and reused to the desired extent, or until they are contaminated with uneconomical amounts of foreign material, may be treated to recover such values as they may contain, and likewise, the acidic liquor from the second acid treatment may be used as all or part of the first acid bath, and may be treated to recover the values therefrom by conventional processing.

The process of the present invention is generally applicable to ore slags, especially tin slags, which contain significant amounts of columbium and tantalum and which may or may not contain economically recoverable amounts of titanium. Such ore slags have accumulated in great quantities over the past years, due to the lack of an economically feasible process for the recovery of the values from such slags. Typical of the analyses of such slags are the following:

| | Ta, Cb, usually as (TaCb₂)O₅, percent | SiO₂, percent | CaO, percent | Fe, percent | TiO₂, percent |
|---|---|---|---|---|---|
| African | 10–30 | 20–40 | 5–20 | 5–20 | 10–20 |
| East Indian | 5–25 | 10–20 | 20–40 | 5–20 | 10–20 |
| United States | 3–10 | 10–30 | 10–30 | 5–20 | 10–20 |

In many of such slags the titanium content may be less or almost negligible, but the process of the present invention may be applied to such slags or other materials having a similar composition.

The slag containing substantial amounts of columbium and tantalum, and with or without substantial amounts of titanium, is first ground to a relatively fine size, such as minus 200 mesh, after which it is mixed with an aqueous solution of an alkali metal hydroxide, the amount of alkali solution being a relatively large amount based on the quantity of slag to be treated. The alkali-slag mixture is then subjected to digestion under heat and pressure, and at temperatures and pressures substantially above atmospheric pressure and the normal boiling temperature of the mixture. The alkali treatment of the slag, under heat and pressure, is continued for a substantial time depending upon the concentration of the alkali, the temperature and pressure, and until a substantial amount of the silica in the slag has been rendered soluble, thereby opening up the slag and making it more feasible to recover the values contained in the undissolved portion of the slag.

The addition of heat to a closed vessel automatically raises the pressure, and while the reaction takes place with heat alone, it is preferable to carry out the reaction under pressure. However, having the pulp in a closed system, under pressure hastens the reaction and makes the process more economical.

The alkali-treated slag is then separated from the treating liquid, and is preferably washed with water to remove additional amounts of the alkali treating solution. The slag residue is then mixed with a sufficient amount of a mineral acid, such as hydrochloric acid, to neutralize the remaining portion of the slag and to provide a substantial excess of acid. Hydrochloric acid is preferred as it is relatively inexpensive and reacts to produce soluble salts of the calcium, magnesium, aluminum, barium, strontium, iron and other compounds which often occur in the slag.

The treatment of the slag residue with acid, according to the present invention, is carried out at elevated temperatures for economic reasons, and ordinarily at relatively high concentrations of acid, but can be carried out at lower temperatures and in weaker acid concentrations, so long as the treatment is sufficiently long to effectively render soluble the various valuable and deleterious impurities in the slag, such as barium, magnesium, calcium, iron, aluminum, strontium, copper and zinc compounds, as well as any rare earth compounds which may have been present in the slag. This acid treatment of the slag residue is not sufficiently severe to dissolve much of the columbium or tantalum compounds contained therein which are still relatively difficult to remove, and would be removed by this acid treatment only after much longer or more severe acid treatment than is required for the removal of the titanium, alkaline earth metal, copper, zinc and aluminum compounds, as well as for the removal of the rare earth metal compounds. After the acid treatment, the acid-slag mixture is diluted with water to hydrolyze and precipitate the columbium and tantalum which have been dissolved. If there is a substantial titanium content, the diluting water preferably contains sodium sulfite to retain the titanium as a soluble salt which can thereby be separated at this stage from the columbium and tantalum.

The slag-acid mixture is then allowed to settle, is decanted, and washed with water.

The slag residue which has been subjected to alkali and then to acid treatment is subjected to a second bath of an alkali metal hydroxide, preferably sodium hydroxide, and this treatment is generally carried out at elevated temperature but at atmospheric pressure and for a sufficient length of time to render soluble a major portion of the silica in the slag, thereby dissolving almost all of its silica, and more susceptible of having its valuable columbium, tantalum and/or titanium content easily recovered.

After heating the slag residue for the second time in an alkali bath, it is separated from the liquor and the remaining slag residue is then subjected to a second acid treatment, again with a strong mineral acid, such as hydrochloric acid, preferably at somewhat elevated temperatures, for a sufficient length of time to convert the columbium and tantalum content to their acidic form. The acid treated slag residue is then allowed to settle, the liquor is decanted, the slag residue is washed, and the insoluble columbium and tantalum compounds may be concentrated, purified and recovered by conventional methods. Where hydrochloric acid is used as the acid treating bath, the salts appear as columbium and tantalum acids, for which the separation, purification and conversion methods are well known.

In rare instances, slags occur which do not include all three of the elements columbium, tantalum and titanium, but the process of the present invention is generally applicable to the slags which contain any one, two or all of these elements as a valuable constituent.

While the process is primarily concerned with the recovery and upgrading of slags containing values in the form of columbium and tantalum, with or without the presence of titanium, the process finds further usefulness in the treatment of such slags which additionally contain significant amounts of tungsten, molybdenum, and the rare earth metals. With such ores, the slag becomes opened up and sufficiently decomposed so that the significant amounts of tungsten, molybdenum, rare earth metals, and often other values, may be recovered from the alkali or acid solutions or from the final slag pulp, such recovery being effected by standard methods of precipitation or solution appropriate to the additional value to be recovered.

It will be understood that the foregoing general description and the following detailed description as well are exemplary and explanatory of the invention but are not restrictive thereof.

The drawing is a schematic process flow sheet which shows the several successive steps of the present invention, in their preferred forms, and at the right hand column are shown the various elements which may be separated as compounds of such elements during the process, in the event that such elements are present in significant quantities in the slag being treated.

Referring now in detail to the present and preferred illustrative form of the process of the present invention, slag containing tantalum, columbium and titanium, or one or more of these three elements, with a major portion of undesired materials such as silica, calcium oxide, other calcium salts, iron compounds, and minor constituents such as molybdenum, tungsten and rare earth metal compounds which may be present in sufficient quantities to make it economically feasible to provide for their recovery. The usual composition of such slags, neglecting their minor constituents, has been set forth above, and will, of course vary depending upon the source of the ores from which the slags have been derived.

The slag is first crushed or ground to bring it to a relatively fine particulate condition, preferably so that it will all pass a 200 mesh screen, although if the slag is not in such a finely divided state, the slag may be treated according to the present invention by subjecting it to prolonged treatment, the length of the treatment depending upon the coarseness of the crushed or ground slag.

The finely divided slag is then mixed with a relatively large quantity of an alkali metal hydroxide and water. For reasons of economy, sodium hydroxide is preferred, although any of the other alkali metal hydroxides may be used in place thereof. Preferably, the ground slag and alkali metal hydroxide are used in the proportion of about 5 tons of ground slag, mixed with about 1200 gallons of a 50% (by weight) sodium hydroxide water solution, and in a pressure vessel or autoclave and are there subjected to digestion under heat and pressure at a temperature of about 185° C. and an internal pressure of from 35 to 60 pounds per square inch (gauge) for about 3 hours. The time of digestion, the temperature and the internal pressure may vary over a considerable range, depending in part upon the composition of the slag and upon the degree of fineness to which the slag has been ground.

The minimum useful concentration of the sodium hydroxide is about 10%, while the maximum concentration is determined by the stirrability of the mixture, which should always be capable of being stirred. The temperature range may vary from 110° C. to boiling under the pressure and alkali concentration being maintained in the pressure vessel. If an alkali metal hydroxide other than sodium hydroxide is used, it should be substituted on a mol-for-mol basis. With higher concentrations of alkali, with higher temperatures and with finer degrees of grinding, the time of digestion can be shortened, the digestion being carried out for a sufficient length of time to effect a satisfactory opening-up of the slag so that its values may be recovered.

After the pressure digestion operation has been concluded, the slag-alkali mixture is discharged into a washing tank and the slag is separated from the liquid portion of the mixture. The excess alkali is washed from the slag by treatment with water to prepare the slag for the next stage of its treatment.

Preferably, the slag material is washed with water while being agitated, is settled and decanted, and the clear supernatant liquor is retained for subsequent use. Likewise, the alkali liquor drained from the digested pulp may be reused after settling.

This first alkaline treatment, removes a considerable amount of the alumina in the slag, removes some of the silica, and to some extent removes some of the other alkali soluble compounds which are present in the ore, at the same time that it carries out its principal purpose of opening-up the slag so that it may be better attacked by the subsequent acid treatment.

The alkali-treated, washed slag is then subjected to an acid treatment, preferably with relatively concentrated hydrochloric acid, which treatment is preferably carried out at a moderately elevated temperature, such as 75° C. for an extended period, such as 8 hours. The concentration of the acid is not critical so long as the treated slag-acid mixture is distinctly acid, preferably at a pH of less than 3. Likewise, the moderately high temperature of 75° C. is used to shorten the time of treatment, and relatively concentrated hydrochloric acid, preferably at about 30° Baumé is used to increase the rate of reaction and to avoid the excess bulk which would be attendant upon the use of lower concentration of acid.

This acid treatment renders soluble the calcium, iron, manganese, magnesium, rare earth metal compounds in the treated slag, as well as rendering soluble any minor amounts of barium, strontium, copper, zinc and aluminum which may be present in the treated slag.

At the conclusion of the acid treatment of the slag residue, the slag residue-acid mixture is diluted with water to hydrolyze and cause the precipitation of the tantalum and columbium compounds which were rendered soluble by the acid, without precipitating the calcium, iron, manganese, magnesium, rare earth metal, barium, strontium, copper, zinc and aluminum compounds which have been rendered soluble by the acid treatment.

In case the slag contains any substantial amount of titanium, which might contaminate the columbium or tantalum content being recovered from the slag, sodium sulfite is added to the slag-acid mixture, preferably before it is diluted with water. This sodium sulfite addition tends to maintain the titanium in soluble form so that it is easily separated from the slag and from the precipitated columbium and tantalum.

For the slag residue or pulp recovered from the alkali treatment of the 5 tons of ground slag, it is preferable to use from 1000 to 3000 gallons of 30° Baumé hydrochloric acid, or even more if needed to dissolve the calcium, iron and other soluble chlorides. After digestion the pulp is diluted with water and from 10 to 50 pounds of sodium sulfite are added. If titanium is present, this water should contain from about 10 to 50 pounds of sodium sulfite in the amount of water added to dilute the acid bath for hydrolysis of the columbium and tantalum compounds.

The slag residue containing the hydrolyzed columbium and tantalum compounds is then allowed to settle and the liquor decanted from it, after which the slag residue may be mixed with water, agitated, settled and the wash water is decanted from it.

The slag residue, as a pulp or slurry, is then subjected to a second treatment with an alkali metal hydroxide solution, preferably sodium hydroxide in about 10–20% solution. This may be the same caustic as was used in the initial pressure digestion. To the remains of the 5 tons of slag initially used, about 500 to 1000 gallons of a 10–20% by weight water solution of sodium hydroxide is added and agitated, for a period of 24 hours, at a temperature ranging from 50° C. to 75° C., but without being subjected to pressure during the heating operation.

In lieu of a 50% solution of sodium hydroxide, the sodium hydroxide may be used in concentrations from 5% to 50%, and the sodium hydroxide used in the second alkaline treating bath may be completely or largely drawn from the decanted and settled liquor removed from the slag after the first alkaline treatment.

The second alkaline treatment of the slag residue dissolves or renders soluble substantially all of the remaining silica in the slag slurry or pulp, and the liquid, after the slag has been heated for the proper time, may be decanted from the solid material, and further removed by washing with water or with recirculated, already used alkali solution.

The slurry from which almost all of the silica, calcium, iron, aluminum and other undesirable compounds have been removed is acidified with an acid which will convert the columbium and tantalum content to their acid form. For this purpose, hydrochloric acid is preferred and a sufficient amount of concentrated hydrochloric acid, preferably at 30° Baumé, is added to render the slurry strongly acidic, preferably pH 3 or less. For this purpose, the residue from 5 tons of slag will generally require from about 300 to 600 gallons of 30° Baumé hydrochloric acid which can be allowed to remain in contact with the slurry for 8 to 24 hours or longer, while being agitated. This second treatment of the slag slurry with acid may be carried out at normal temperatures of from 25° to 35° C. or at higher temperatures, but generally not exceeding 50° C.

When the second acid treatment has been completed, the acidic liquid is allowed to settle and is decanted from the solid matter contained in it.

By the process of the present invention, substantially all of the columbium and tantalum contained in the slag is recovered in the final acidic residue, and from 80% to 90% or even more of the silica, iron, aluminum, barium, magnesium, manganese, strontium, copper and zinc compounds have been removed and separated from the columbium and tantalum. Also, any rare earth metals, molybdenum, tungsten or titanium present in the slag has been separated from the columbium and tantalum, so that subsequent purification of the columbium and tantalum and their separation from each other is simplified, at the same time allowing easy recovery of the rare earth metals, molybdenum, tungsten and titanium contained in the slag.

The invention in its broader aspects is not limited to the specific steps, processes and compositions shown and described but departures may be made therefrom within the scope of the accompanying claims without departing from the principles of the invention and without sacrificing its chief advantages.

What is claimed is:

1. The method of recovering values from a siliceous slag having: an $SiO_2$ content in the range of about 10 to 40% by weight; impurities, including water-insoluble calcium-containing compounds; and, at least one of the elements columbium and tantalum, which comprises: grinding the slag to a relatively fine mesh; treating the ground slag with a water solution of at least 10% concentration of an alkali metal hydroxide at elevated temperatures substantially above the atmospheric boiling point of the alkali hydroxide solution under pressure of at least 35 p.s.i.g. to open the slag and to render more accessible calcium-containing and other impurities contained therein for further treatment for removal of such impurities; separating the alkali metal hydroxide liquor from the slag solids; acidifying the solids with a mineral acid capable of solubilizing metal radicals of the insoluble impurities, including calcium of the calcium-containing impurities, to convert the calcium-containing and other water insolubles to a water-soluble form; the acid being added in an amount sufficient to neutralize the remaining portion of the slag; separating the acid liquor from the slag; washing the solids to remove calcium-containing and other impurities in soluble form therefrom; treating the solids with an alkali metal hydroxide to solubilize silica contained therein; separating the solids from the alkali solution; treating the solids with acid and recovering the columbium and tantalum in their acid form from the residue.

2. The method according to claim 1 wherein the alkali metal hydroxide is sodium hydroxide and the mineral acid is hydrochloric acid.

3. The method of claim 1 in which the slag additionally contains titanium, and the first acid treatment is immediately followed by dilution of the acid in the presence of sodium sulphite so that the titanium compounds contained in the acid liquor are protected against hydrolysis and may thereby be separated from the hydrolyzed columbium and tantalum compounds.

4. The method of recovering values from a siliceous slag having: an $SiO_2$ content in the range of about 10 to 40% by weight; impurities, including water-insoluble calcium-containing compounds; and, at least one of the elements columbium and tantalum, which comprises: grinding the slag to a relatively fine mesh; treating the ground slag with a water solution of at least 10% concentration of an alkali metal hydroxide at elevated temperatures substantially above the atmospheric boiling point of the alkali hydroxide solution under pressure of at least 35 p.s.i.g. to open the slag and to render more accessible calcium-containing and other impurities contained therein for further treatment for removal of such impurities; separating the alkali metal hydroxide liquor from the slag solids; acidifying the solids with a mineral acid capable of solubilizing metal radicals of the insoluble impurities, including calcium of the calcium-containing impurities, to convert the calcium-containing and other water insolubles to a water-soluble form; the acid being added in an amount sufficient to neutralize the remaining portion of the slag and to provide a substantial excess of acid; diluting the acid with water to hydrolyze and precipitate columbium and tantalum compounds from the acid liquor; separating the acid liquor from the slag; washing the solids to remove calcium-containing and other impurities in soluble form therefrom; treating the solids with an alkali metal hydroxide to solubilize silica contained therein; separating the solids from the alkali solution; treating the solids with acid and recovering the columbium and tantalum in their acid form from the residue.

5. The method according to claim 4 wherein the alkali metal hydroxide is sodium hydroxide and the mineral acid is hydrochloric acid.

6. The method of claim 4 in which the slag additionally contains titanium, and the first acid treatment thereof is immediately followed by the addition of sodium sulphite so that the titanium compounds contained in the acid liquor are protected against hydrolysis and precipitation.

References Cited in the file of this patent

UNITED STATES PATENTS

| | | |
|---|---|---|
| 2,950,966 | Foos | Aug. 30, 1960 |
| 2,953,453 | Foos | Sept. 20, 1960 |
| 2,956,857 | Ruhoff et al. | Oct. 18, 1960 |
| 3,058,825 | Cardon | Oct. 16, 1962 |
| 3,061,407 | Burkin et al. | Oct. 30, 1962 |

OTHER REFERENCES

Hampel: "Rare Metals Handbook," Reinhold Publ. Corp., New York, 1954, pages 390–391.